Dec. 15, 1931.  T. ZERBI  1,836,300

CARBURETOR FOR AIRCRAFT ENGINES

Filed May 28, 1930

Inventor,
Tranquillo Zerbi.
By
atty.

Patented Dec. 15, 1931

1,836,300

UNITED STATES PATENT OFFICE

TRANQUILLO ZERBI, OF TURIN, ITALY, ASSIGNOR TO FIAT SOCIETÁ ANONIMA, OF TURIN, ITALY

CARBURETOR FOR AIRCRAFT ENGINES

Application filed May 28, 1930, Serial No. 456,472, and in Italy December 21, 1929.

This invention refers to a device which is very simple in construction and absolutely reliable in working under the pilot's control which permits the regular working of aircraft engines during normal flight as well as during flight in inverted load conditions. By this device the pilot's control is transmitted to a distributor which, according to its position, connects the normal larger spray nozzle or an auxiliary spray nozzle for the flight in inverted load conditions with the carburetor suction pipe.

According to this invention the distributor permits the supply of liquid fuel to the suction pipe of the carburetor through the float chamber during normal flight and directly from the tube past said chamber, of course through a suitable adjusted spray nozzle, during the flight in inverted load conditions.

A construction of the object of this invention is diagrammatically shown on the accompanying drawings, in which.

Figure 1:
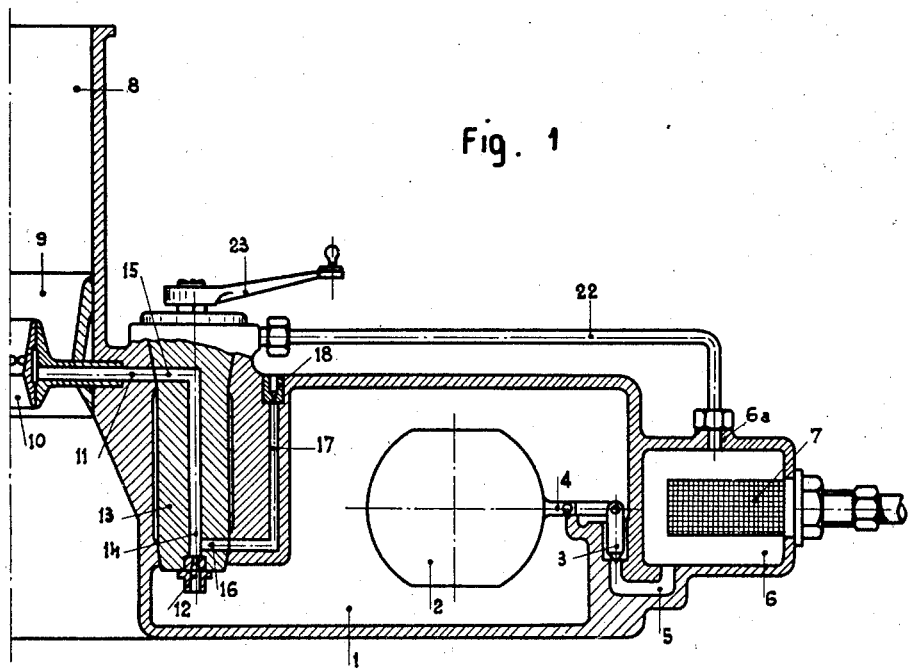
Figure 1 is a sectional view of the carburetor according to this invention.

Referring to the drawings, 1 is the carburetor chamber having a float 2 which through a lever 4 and a needle 3 articulated thereto controls the fuel flow from the conduit 5 connected with the distributing chamber 6 containing the filter 7.

The suction pipe 8 of the carburetor is provided with two Venturi tubes 9 and 10 to the latter of which the mixture flows through a conduit 11. The normal spray nozzle 12 of the carburetor is mounted on the rotatable member 13 having slightly conical ends, provided with a central axial bore 14 connected through a radial conduit 15 with the conduit 11. A branch pipe 16 extends from the lower end of the bore 14 and is connected in the position of the member 13 shown in Fig. 1 with a conduit 17 opening outwards through an adjusted air intake 18.

Figure 2:
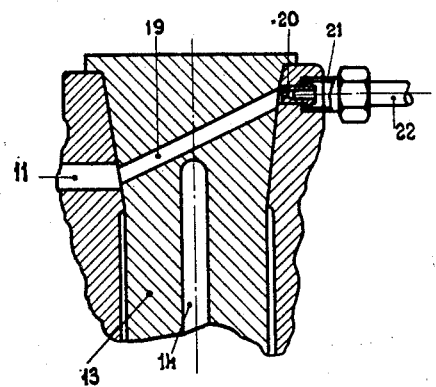
Figures 2 and 3 show a longitudinal section and a cross section, respectively, of the distributor.
Figure 3:
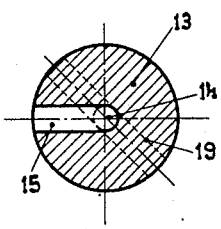

In the upper portion of the rotatable member 13 (Fig. 2) is formed another conduit 19, inclined with respect to the axis of said member 13, which connects the conduit 11 of the Venturi tube 10 with an auxiliary spray nozzle 20 (Fig. 2) arranged on a connecting pipe 21 of a pipe 22 opening at 6a into the distributing chamber 6.

The rotatable member 13 is provided above with an operating lever 23 that may be acted upon by the pilot through a suitable transmission not shown.

The carburetor according to this invention works as follows: In the normal position of the flying machine the member 13 is as shown in Fig. 1 and the fuel flows to the Venturi tubes of the carburetor suction pipe through the float chamber 1 while the connection with the pipe 22 is cut off. Before reversing the flying machine and at any moment the pilot deems it convenient in order to vary the fuel supply to the engine, the pilot acts upon the lever 23 and brings the member 13 into the position shown in Fig. 2 in which the fuel is supplied to the engine through the auxiliary spray nozzle 20. By means of this device the carburetor is regularly supplied with fuel in any position and condition of flight and the pilot can reverse the flying machine and perform any desired acrobacy maintaining a direct control on the fuel supply.

What I claim is:

1. In a carburetor for aircraft engines, in combination with a main spray nozzle, an auxiliary spray nozzle adapted to work in inverted load conditions and means under the pilot's control for supplying fuel through either spray nozzle.

2. In a carburetor for aircraft engines, in combination with a float chamber, a main spray nozzle in said float chamber, a distributing chamber, an auxiliary spray nozzle adapted to work in inverted load conditions, a conduit controlled by the float connecting said distributing chamber with the float chamber and a pipe connecting said distributing chamber with said auxiliary nozzle and means under the pilot's control for supplying fuel through either of said nozzles.

3. In a carburetor for aircraft engines, in combination with a float chamber and a Venturi tube, a distributor rotatably mounted in said chamber, means under the pilot's control for actuating said distributor, a main spray nozzle carried by said distributor and communicating with the bottom of said float chamber, a conduit connecting in one position of the distributor said main spray nozzle with the Venturi tube, an auxiliary spray nozzle adapted to be connected with said Venturi tube in another position of the distributor, a distributing chamber, a conduit controlled by the float connecting said distributing chamber with the float chamber and a pipe connecting said distributing chamber with the auxiliary spray nozzle.

In testimony that I claim the foregoing as my invention, I have signed my name.

TRANQUILLO ZERBI.